(12) United States Patent
Yang

(10) Patent No.: US 9,239,965 B2
(45) Date of Patent: Jan. 19, 2016

(54) METHOD AND SYSTEM OF TRACKING OBJECT

(71) Applicant: Electronics and Telecommunications Research Institute, Daejeon (KR)

(72) Inventor: Hoe Sung Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 144 days.

(21) Appl. No.: 13/907,215

(22) Filed: May 31, 2013

(65) Prior Publication Data
US 2013/0329950 A1    Dec. 12, 2013

(30) Foreign Application Priority Data

Jun. 12, 2012 (KR) .......... 10-2012-0062797
Dec. 17, 2012 (KR) .......... 10-2012-0147734

(51) Int. Cl.
*G06K 9/00* (2006.01)
*G06K 9/62* (2006.01)

(52) U.S. Cl.
CPC .............. *G06K 9/62* (2013.01); *G06K 9/00771* (2013.01); *G06K 9/6289* (2013.01); *G06K 2209/27* (2013.01)

(58) Field of Classification Search
USPC ......... 382/100, 103, 106, 107, 181, 190, 195; 348/135, 143, 169–172; 345/419, 633
See application file for complete search history.

(56) References Cited

U.S. PATENT DOCUMENTS

| | | | | |
|---|---|---|---|---|
| 5,764,786 A * | 6/1998 | Kuwashima et al. | ......... | 382/107 |
| 6,993,158 B2 * | 1/2006 | Cho et al. | ....... | 382/103 |
| 7,130,448 B2 * | 10/2006 | Nagaoka et al. | ........ | 382/104 |
| 7,218,318 B2 * | 5/2007 | Shimazu | ........ | 345/419 |
| 7,526,104 B2 * | 4/2009 | Nagaoka et al. | ........ | 382/104 |
| 7,773,087 B2 * | 8/2010 | Fowler et al. | ........ | 345/426 |
| 7,804,981 B2 * | 9/2010 | Viggiano et al. | ........ | 382/104 |
| 8,325,979 B2 * | 12/2012 | Taborowski et al. | ......... | 382/103 |
| 2011/0199461 A1 * | 8/2011 | Horio et al. | ........ | 348/46 |

FOREIGN PATENT DOCUMENTS

| | | |
|---|---|---|
| KR | 10-2001-0027835 A | 4/2001 |
| KR | 10-2001-0061096 A | 7/2001 |
| KR | 10-2001-0063820 A | 7/2001 |
| KR | 10-2002-0069490 A | 9/2002 |
| KR | 10-2007-0018952 A | 2/2007 |
| KR | 10-2007-0121939 A | 12/2007 |
| KR | 10-0815920 B1 | 3/2008 |
| KR | 10-2009-0037297 A | 4/2009 |

* cited by examiner

*Primary Examiner* — Anand Bhatnagar
(74) *Attorney, Agent, or Firm* — Rabin & Berdo, P.C.

(57) ABSTRACT

Provided is a method and system for tracking an object that may track a point into which an object is to move by combining the object in an image and position coordinates of the object acquired through a position tracking apparatus provided to the object and thereby displaying the position coordinates.

16 Claims, 4 Drawing Sheets

METHOD AND SYSTEM OF TRACKING OBJECT

CROSS-REFERENCE TO RELATED APPLICATIONS

This application claims the priority benefit of Korean Patent Application No. 10-2012-0062797, filed on Jun. 12, 2012, in the Korean Intellectual Property Office, and Korean Patent Application No. 10-2012-0147734, filed on Dec. 17, 2012, in the Korean Intellectual Property Office, the disclosures of which are incorporated herein by reference.

BACKGROUND

1. Field of the Invention

Embodiments of the present invention relate to a method and system for tracking an object that may track a point into which an object is to move by combining the object in an image and position coordinates of the object acquired through a position tracking apparatus provided to the object and thereby displaying the position coordinates.

2. Description of the Related Art

A conventional object tracking model using a camera may track a position of an object through image processing by comparing and analyzing previous frame data and current frame data collected from the camera, in real time, and by measuring a level of change.

However, the conventional object tracking model has some constraints in processing information in real time since a significantly large amount of calculations is required. Further, the conventional object tracking model may not separate and thereby track an object when an overlapping object is present in an image or a size of the object is small.

Accordingly, there is a need for technology capable of accurately tracking a position of an object from image information with respect to a plurality of objects moving in real time.

SUMMARY

An aspect of the present invention provides a method and system for tracking an object that may accurately track a moving position of an object within an image by receiving information about a position of the object from a position tracking apparatus attached to the object, and by applying the received information to image information obtained by capturing the object.

Another aspect of the present invention also provides a method and system for tracking an object that may quickly recognize a current position of an object by combining image information of a camera and real-time movement information of the object including a position tracking apparatus.

Another aspect of the present invention also provides a method and system for tracking an object that may track a position of each object by receiving information about a position of an object from a position tracking apparatus attached to the object and by mapping the received information and a corresponding object in image information, which may solve a problem found in the related art that it is difficult to track positions of a plurality of objects due to overlapping between objects in image information.

According to an aspect of the present invention, there is provided a method of tracking an object within image information, the method including: extracting the object from image information; receiving position coordinates of the extracted object; and tracking integrated position information about the object by combining information about the extracted object and the received position coordinates.

According to another aspect of the present invention, there is provided an object tracking system, including: an object extractor to extract an object from image information; a position information receiver to receive position coordinates of the extracted object; and an object tracker to track integrated position information about the object by combining information about the extracted object and the received position coordinates.

EFFECTS

According to embodiments of the present invention, it is possible to accurately track a moving position of an object within an image by receiving information about a position of the object from a position tracking apparatus attached to the object, and by applying the received information to image information obtained by capturing the object.

According to embodiments of the present invention, it is possible to quickly recognize a current position of an object by combining image information of a camera and real-time movement information of the object including a position tracking apparatus.

According to embodiments of the present invention, it is possible to track a position of each object by receiving information about a position of an object from a position tracking apparatus attached to the object and by mapping the received information and a corresponding object in image information, which may solve a problem found in the related art that it is difficult to track positions of a plurality of objects due to overlapping between objects in image information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
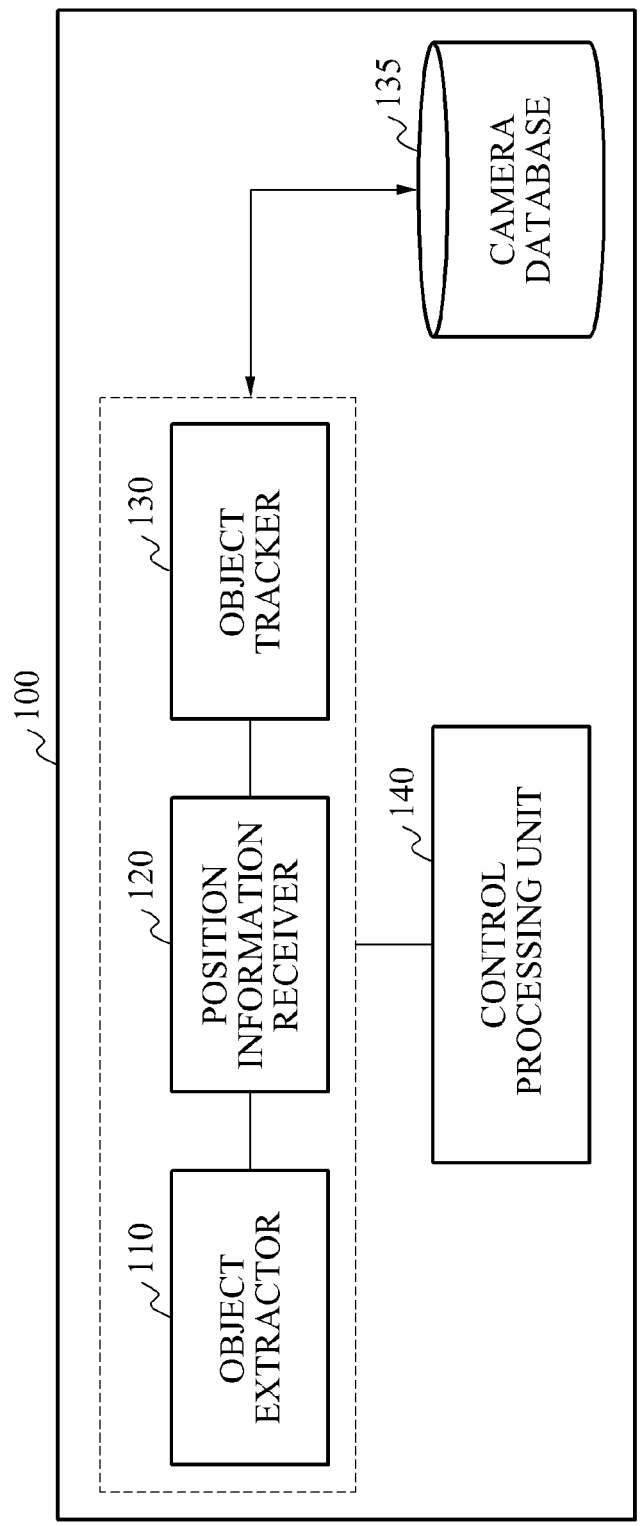
FIG. 1 is a block diagram illustrating an object tracking system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, various embodiments of the present invention will be described with reference to the accompanying drawings, but the present invention is not limited thereto or restricted thereby.

The term "object" used throughout the present specification is an object to be photographed, and may refer to an external object, for example, an organic body such as a human and an animal, a moving body, and a fixing body, on which a gazing focus of a camera is formed. In particular, the term "object" may indicate an object that is included in image information and has a value as information.

For example, in image information generated by a camera photographing urban landscapes, an object may be a citizen who walks on the streets of a city while occupying a predetermined area in the image information. Street trees, streetlamps, and the like, which occupy a relatively small area in picture information and are fixed as distant background may not be referred to as or extracted as an object.

Image information generated through a camera may include a primary object that is a main target to be photographed and a sub-object that is captured together with the primary object.

Accordingly, an object tracking system according to an embodiment of the present invention may receive position coordinates from an individual object equipped with a position tracking apparatus, and may analyze the received position coordinates and thereby provide an environment capable of tracking a path via which each object moves.

FIG. 1 is a block diagram illustrating an object tracking system 100 according to an embodiment of the present invention.

Referring to FIG. 1, the object tracking system 100 may include an object extractor 110, a position information receiver 120, and an object tracker 130. Also, the object tracking system 100 may further include a control processing unit 140 depending on embodiments.

The object extractor 110 may extract an object from image information. That is, the object extractor 110 serves to identify, from image information generated through a camera, an object that is included in the image information.

For example, the object extractor 110 may extract, from image information generated by photographing urban landscapes based on citizen A walking on the streets as objects, the citizen A, accompanying citizen B, and citizen C who is walking on a side to face the citizen A. Here, the object extractor 110 may determine that streetlamps, street trees, and the like which occupy a relatively small area and of which positions are fixed are objects having no value as information and thereby exclude the objects from targets to be extracted.

A method of extracting an object from image information may include an extraction method using contour information of an object, extraction method using a major feature point of an object, an extraction method based on a three-dimensional (3D) model or an area, and the like. The object extractor 110 of the present invention may extract an object from image information by appropriately employing such known methods.

The position information receiver 120 may receive position coordinates about the extracted object. A method of receiving position information from a position tracking apparatus may include, for example, a method in which a position tracking apparatus autonomously calculates absolute coordinates of coordinate information and transmits the coordinate information, a method in which a position tracking apparatus only generates a signal, and the generated signal is received using a plurality of reception apparatuses or minimum at least one reception apparatus and a position is calculated at a reception apparatus using a measurement scheme, for example, a triangulation scheme-time, angle, signal strength, and the like, or by complexly employing the methods, and the like.

Further, a method of requiring position information may include, for example, a method of requesting and thereby receiving an event, a method of transmitting a signal at predetermined time intervals using a position tracking apparatus, and the like.

Hereinafter, an example of requesting an event and transmitting absolute coordinates from a position tracking apparatus will be described. However, it is only an example for ease of description and thus, does not limit a configuration of acquiring position information.

For example, the position information receiver 120 may receive position information from a position tracking apparatus attached to an object a plurality number of times during a predetermined period of time. The object tracker 130 may verify a moving type of the object according to elapse of time by mapping information about the extracted object, for example, object information, and position information of the position information receiver 120.

A reception time may be freely set by an executor according to an embodiment of the present invention. For example, the reception time may be set at predetermined time intervals after a request for tracking an object is received.

A position tracking apparatus may be an apparatus of tracking a position using an algorithm capable of performing wireless communication and also tracking a position.

The position tracking apparatus may be mounted to the object and, for example, may calculate position coordinates of the object in response to a request for tracking the object in the object tracking system of the present invention.

As an example associated with receiving position coordinates of the object, the position information receiver 120 may transmit an event signal to the position tracking apparatus included in the object according to arrival of the set reception time, and may receive position coordinates of the object calculated by the position tracking apparatus in response to the event signal. Alternatively, the position tracking apparatus may transmit position information at predetermined time intervals.

In addition, the position tracking apparatus may generate a signal, and the position information receiver 120 may detect the signal and calculate position information. For example, the position information receiver 120 serves to obtain position information about a point at which the object is located.

For example, with respect to image information associated with the above urban landscapes, the position information receiver 120 may directly receive position information from a position tracking apparatus of each of the citizens A, B, and C that are extracted as objects, and may calculate position coordinates by detecting the signal generated from the position tracking apparatus. The object tracker 130 may track integrated position information about the object based on object information extracted from the object extractor 110 and the received position coordinates. That is, the object tracker 130 may search a camera database 135 for an installation position of the camera as the camera position coordinates, may set, on the image information, a coordinate system that uses the retrieved camera position coordinates as a reference point, and may map the position coordinates received by the position receiver 120 by setting position information of the extracted object on the coordinate system using the object extractor 110.

The camera database 135 may store position coordinates at which the camera is registered to be installed, and may receive position coordinates corresponding to identification information of the corresponding camera from, for example, a facility company having installed the camera and may store the received position coordinates.

In the coordinate system, a position may be specified by equivalently dividing a plane of image information by 'n' with respect to the width and the length and by allocating a predetermined coordinate value to each contact point formed by the equivalent division. Here, 'n' denotes a natural number. For example, the object tracker 130 may generate a two-dimensional (2D) coordinate system by generating a plurality of horizontal and vertical equivalent lines using camera position coordinates of the camera as an origin. This example is not limited to the 2D coordinate system and may be expanded to a 3D coordinate system.

In the aforementioned example, even though the installation position of the camera is used as a reference point of the coordinate system, the object tracker 130 may determine a feature point, for example, a landmark within image information or a predetermined point of the generated coordinate system as a reference point.

Also, the object tracker 130 may track integrated position information about the object by mapping the object and position information on the coordinate system. That is, the object tracker 130 may track an object moving within an image by allocating position coordinates of the position information receiver 120 to the extracted object information, and may calculate a direction in which and a speed at which the object is actually moving, by further considering the received position information.

In extracting the object from image information, it is possible to extract a plurality of objects from a plurality of items of image information, and to configure a wide image about the plurality of objects in the case of combining position coordinates of the plurality of objects and mapping the plurality of objects and a plurality of items of object information of which positions are calculated.

Further, in tracking integrated position information about the object, it is possible to configure a multi-dimensional image by combining information about the extracted object and the position coordinates.

Figure 2:
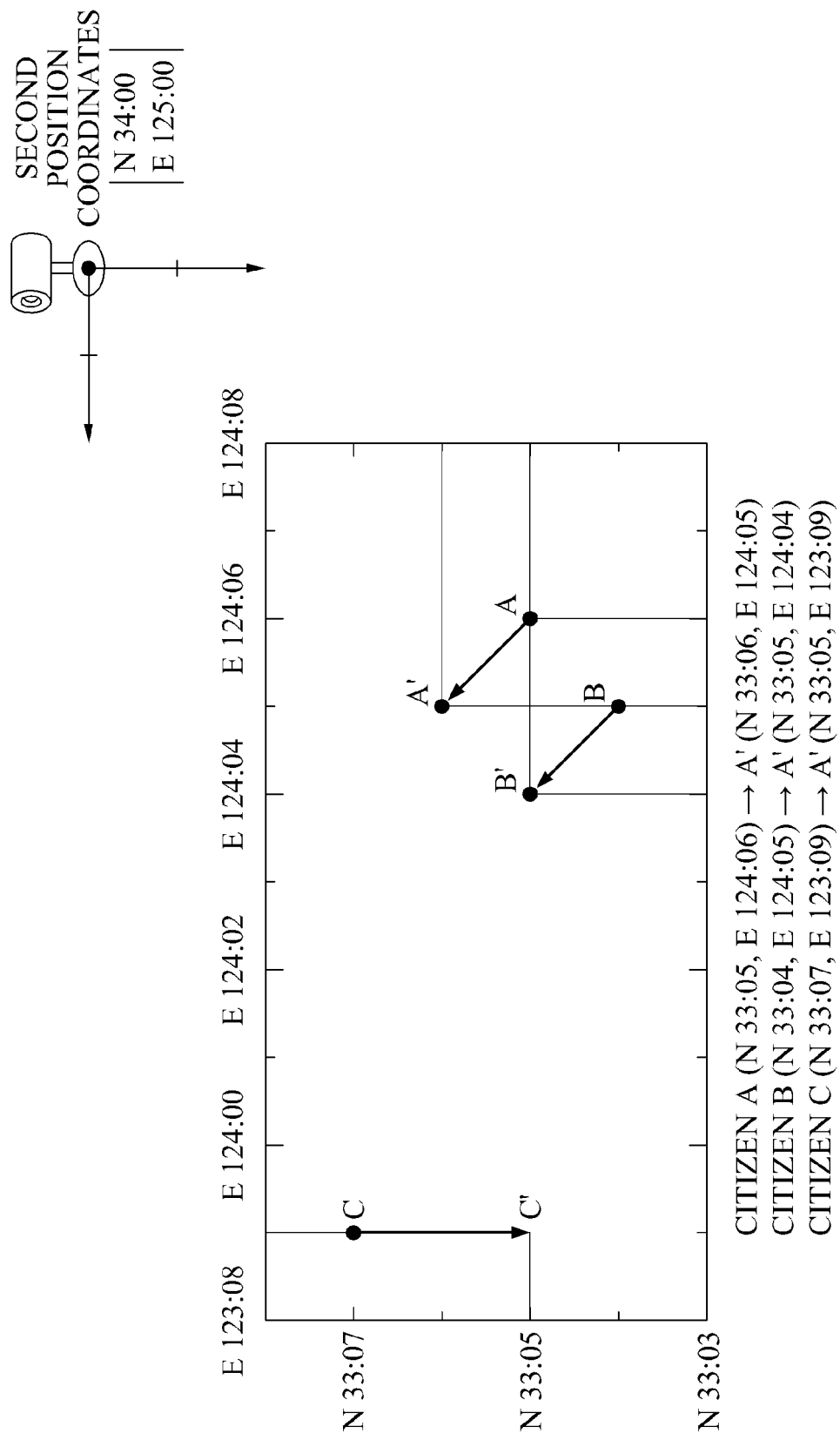
FIG. 2 is a diagram illustrating an example of mapping position coordinates of an object on a coordinate system according to an embodiment of the present invention.

FIG. 2 is a diagram illustrating an example of mapping position coordinates of an object on a coordinate system according to an embodiment of the present invention.

FIG. 2 illustrates an example in which citizens A, B, and C are extracted as objects from image information, and two sets of position coordinates are sequentially received at predetermined time intervals, for example, a first reception time and a second reception time from position tracking apparatuses attached to the citizens A, B, and C, respectively.

Referring to FIG. 2, the object tracker 130 may generate, on image information, a coordinate system that is equivalently divided into vertical lines, eastern longitude lines, and horizontal lines, northern latitude lines, by employing, as a reference point, position coordinates (N34:00, E125:00) corresponding to an installation position of a camera.

With respect to the citizen A, the object tracker 130 may map, on the coordinate system, position coordinates (N33:05, E124:06) received at the first reception time. Next, the object tracker 130 may track a moving state of the object in an image by tracking position coordinates (N33:06, E124:05) received at the second reception time. Further, the object tracker 130 may draw the trace of the citizen A based on time and position coordinate information received at the first reception time and the second reception time.

Next, the object tracker 130 may track that the citizen A is moving toward the northeast at a predetermined speed, for example, a movement change amount/time interval, based on a plurality of sets of position coordinates associated with the citizen A.

Similarly, with respect to the citizen B that is accompanied by the citizen A, the object tracker 130 may map, on the coordinate system, position coordinates (N33:04, E124:05) received at the first reception time and position coordinates (N33:05, E124:04) received at the second reception time.

Next, the object tracker 130 may track that the citizen B is moving toward the same direction and at the same speed as the citizen A based on a plurality of sets of position coordinates associated with the citizen B that are mapped on the coordinate system.

With respect to the citizen C that is positioned on a side opposite to the citizen A, the object tracker 130 may map, on the coordinate system, position coordinates (N33:07, E123:09) received at the first reception time and position coordinates (N33:05, E123:09) received at the second reception time.

Next, the object tracker 130 may track that the citizen C is moving toward the south at a faster speed than the citizens A and B based on a plurality of sets of position coordinates associated with the citizen C that are mapped on the coordinate system.

As described above, the object tracking system 100 according to an embodiment of the present invention may accurately track a current position of an object by receiving information about a position of an object from a position tracking apparatus attached to the object, and by applying image information obtained by photographing the object.

Depending on embodiments, the object tracking system 100 may further include the control processing unit 140 of FIG. 1.

The control processing unit 140 may display the received position coordinates on the image information about the object. That is, the control processing unit 140 may display the position coordinates received from the position tracking system 100 together with the object by including the image information. Through this, the control processing unit 140 enables information about the position of the object to be provided to the user who views the image information in real time.

In addition, the control processing unit 140 may indicate the tracked integrated position information on the image information using a separate symbol and a picture, for example, an error indicator in association with the object. That is, the control processing unit 140 may include and thereby display the tracked position of the object in the image information. This also enables the user to easily recognize the tracked position of the predetermined object.

Figure 3:
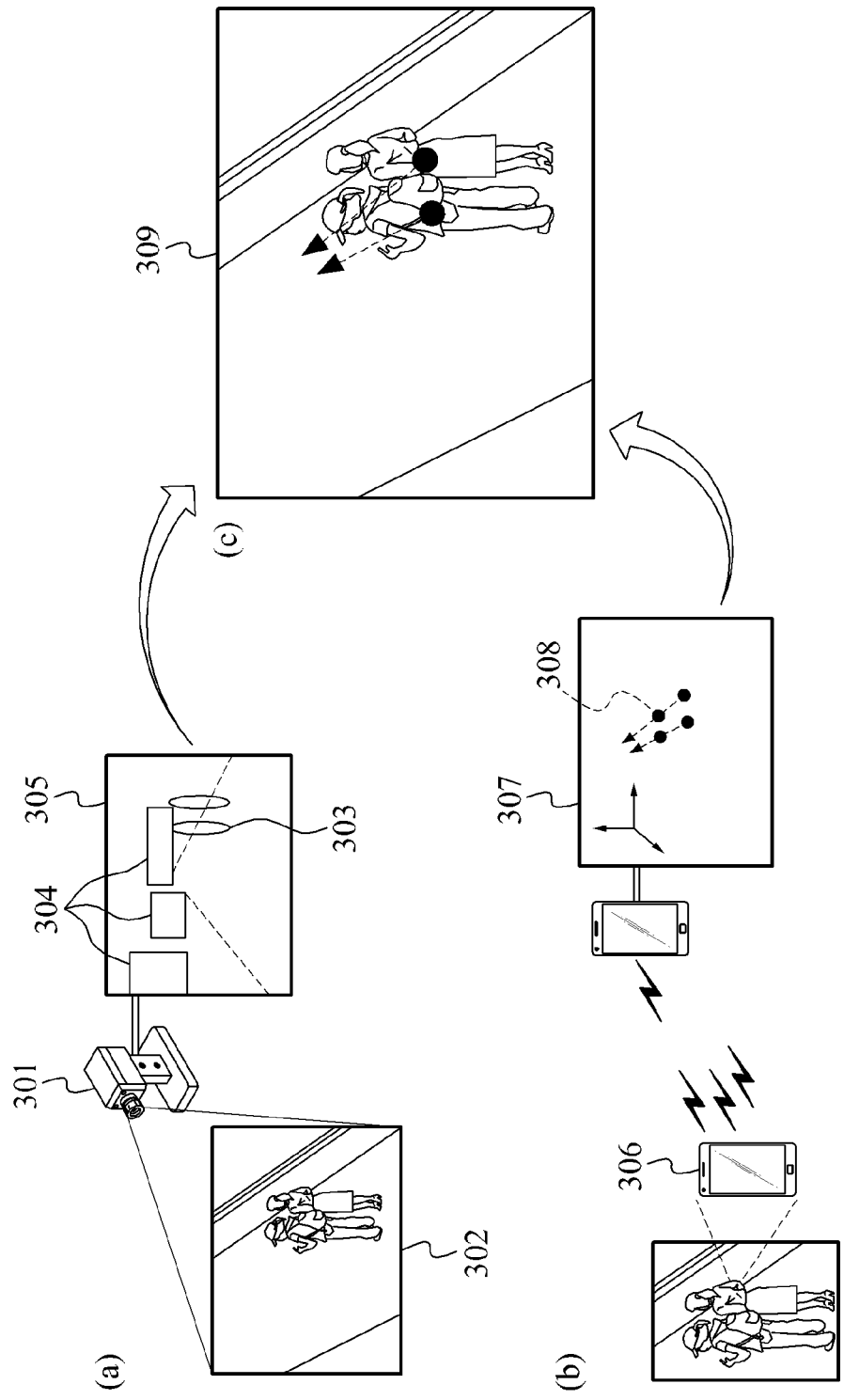
FIG. 3 is a diagram illustrating an example of tracking an object in image information according to an embodiment of the present invention.

FIG. 3 is a diagram illustrating an example of tracking an object in image information according to an embodiment of the present invention.

Example (a) of FIG. 3 illustrates a process of extracting an object from image information 302 generated using a camera 301. The object tracking system 100 may extract, from the image information 302, a primary object 303, a moving object, and sub-objects 304, fixed objects, which are targets to be photographed, and may generate object image information 305 in which only extracted objects are displayed.

Example (b) of FIG. 3 illustrates a process of receiving position coordinates of the primary object 303 from a position tracking apparatus 306 provided to the primary object 303, and mapping a plurality of sets of position coordinates on a coordinate system 307. The object tracking system 100 may set the coordinate system 307 that uses, as a reference point, camera position coordinates at which the camera 301 is set, and may map the plurality of sets of received position coordinates on the coordinate system 307.

Next, the object tracking system 100 may track the position of the primary object 303 by analyzing the plurality of sets of position coordinates mapped on the coordinate system 307, and may display the tracking result using an arrow indicator 308.

Example (c) of FIG. 3 illustrates image information 309 that includes the position tracking result obtained by combining the image information 302 and the result of tracking the position of the primary object 303.

Accordingly, the object tracking system 100 may extract and coordinate an object moving in an initial frame of image information collected using a camera, and may combine coordinates of the object and position coordinates obtained from a position tracking apparatus and thereby track the object in image information based on movement coordinates obtained from the position tracking apparatus.

Hereinafter, an operation of the object tracking system 100 according to an embodiment of the present invention will be described.

Figure 4:
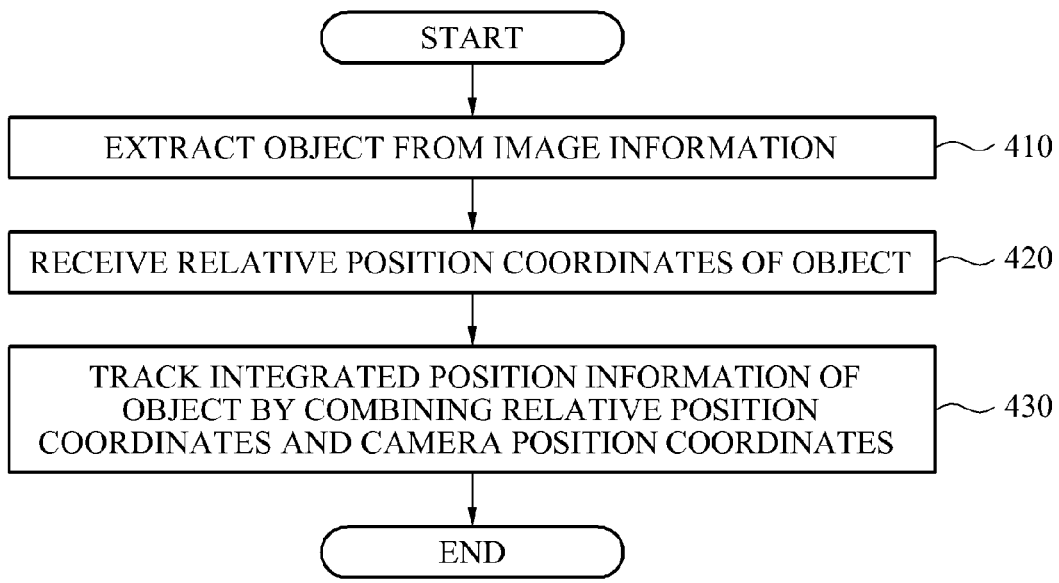
FIG. 4 is a flowchart illustrating a method of tracking an object according to an embodiment of the present invention.

FIG. 4 is a flowchart illustrating a method of tracking an object according to an embodiment of the present invention.

The object tracking method according to the present embodiment may be performed by the aforementioned object tracking system 100.

In operation 410, the object tracking system 100 may extract an object from image information. Operation 410 may be a process of identifying an object included in the image information, from the image information generated using a camera.

A scheme of extracting an object from image information, which may be employed in operation 410, may include an extraction scheme using counter information of an object, an extraction scheme using a major feature point of an object, an extraction scheme based on a 3D model or an area, and the like.

In operation 420, the object tracking system 100 may receive position information from a position tracking apparatus attached to the object. Operation 420 may be a process of receiving position related information from the position tracking apparatus attached to the object. In particular, in operation 420, the object tracking system 100 may receive the position related information a plurality of number of times at predetermined time intervals to make it possible to verify a moving type of the object according to elapse of a time.

In association with receiving position coordinates of the object, the object tracking system 100 may transmit an event signal to the position tracking apparatus included in the object according to arrival of the set reception time, and may receive position coordinates of the object calculated by the position tracking apparatus in response to the event signal. Alternatively, the position tracking apparatus may transmit position information at predetermined time intervals. In addition, the position tracking apparatus may generate a signal, and the position information receiver 120 may detect the signal and calculate position information. For example, the position information receiver 120 serves to obtain position information about a point at which the object is located. In operation 430, the object tracking system 100 may track integrated position information of the object based on camera position coordinates of the camera used to generate the image information and a plurality of sets of position coordinates received. Operation 430 may be a process of searching the camera database 135 for an installation position of the camera as the camera position coordinates, setting, on the image information, a coordinate system that uses the retrieved camera position coordinates as a reference point, and mapping, on the coordinate system, the plurality of sets of position coordinates received. Here, reference coordinates are not limited to the camera position coordinates of the camera.

Also, the object tracking system 100 may track integrated position information about the object by analyzing the plurality of sets of position coordinates mapped on the coordinate system, and by calculating at least one of a moving direction and a moving speed of the object.

For example, in operation 430, the object tracking system 100 may calculate a direction in and a speed at which the object actually moves based on a change in a position at which position coordinates are mapped on the coordinate system and a change amount of the position.

According to an expanded embodiment, the object tracking system 100 may display the received position coordinates on the image information in association with the object. That is, the object tracking system 100 may display the position coordinates received from the position tracking apparatus together with the object included in the image information. Accordingly, the object tracking system 100 may provide information about the position of the object to the user who views the image information in real time.

In addition, the object tracking system 100 may indicate the tracked integrated position information on the image information using a separate symbol and a picture, for example, an error indicator in association with the object. That is, the object tracking system 100 may include and thereby display the tracked position of the object in the image information. This also enables the user to easily recognize the tracked position of the predetermined object.

According to embodiments of the present invention, it is possible to accurately track a current position of an object and a desired movement position of the object by receiving information about a position of the object from a position tracking apparatus attached to the object and by applying the received information to image information obtained by photographing the object.

According to embodiments of the present invention, a user is enabled to quickly recognize a current position of an object by combining image information of a camera and real-time movement information of the object including a position tracking apparatus.

According to embodiments of the present invention, it is possible to solve a conventional issue that it is difficult to track positions of a plurality of objects due to overlapping between objects in image information by receiving information about a position of the object from a position tracking apparatus attached to the object and by mapping the received information with the object of the image information.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of tracking an object within image information, the method comprising:
    extracting the object from image information;
    receiving position coordinates of the extracted object; and
    tracking integrated position information about the object by combining information about the extracted object and the received position coordinates,
    wherein the tracking comprises:
    searching a camera database for an installation position of the camera as the camera position coordinates;
    setting, on the image information, a coordinate system that uses the retrieved camera position coordinates as a reference point;
    mapping the received position coordinates on the coordinate system; and
    searching for camera position coordinates of a camera used to generate the image information, as information about the extracted object.

2. The method of claim 1, further comprising:
    extracting a plurality of objects from a plurality of items of image information; and
    configuring a wide image about the plurality of objects by combining position coordinates of the plurality of objects.

3. The method of claim 1, wherein the tracking further comprises configuring a multi-dimensional image by combining information about the extracted object and the received position coordinates.

4. The method of claim 1, wherein the tracking further comprises setting, on the image information, a coordinate system that uses a feature point within the image information as a reference point and mapping the received position coordinates on the coordinate system.

5. The method of claim 1, wherein the tracking further comprises tracking integrated position information about the object by calculating at least one of a moving direction and a moving speed of the object.

6. The method of claim 1, wherein the receiving comprises receiving, as the position coordinates, coordinates of the object that is calculated in association with a position tracking apparatus provided to the object.

7. The method of claim 1, further comprising:
    displaying the received position coordinates on the image information in association with the object.

8. The method of claim 1, further comprising:
    displaying the tracked integrated position information on the image information in association with the object using at least one of a symbol and a picture.

9. An object tracking system, comprising:
    an object extractor to extract an object from image information;
    a position information receiver to receive position coordinates of the extracted object; and
    an object tracker to track integrated position information about the object by combining information about the extracted object and the received position coordinates,
    wherein the object tracker searches for an installation position of the camera as the camera position coordinates, sets, on the image information, a coordinate system that uses the retrieved camera position coordinates as a reference point, and maps the received position coordinates on the coordinate system, and wherein the object extractor searches for camera position coordinates of a camera used to generate the image information, as information about the extracted object.

10. The object tracking system of claim 9, wherein when a plurality of objects is extracted from a plurality of items of image information by the object extractor, the object tracker configures a wide image about the plurality of objects by combining position coordinates of the plurality of objects.

11. The object tracking system of claim 9, wherein the object extractor configures a multi-dimensional image by combining information about the extracted object and the received position coordinates.

12. The object tracking system of claim 9, wherein the object tracker sets, on the image information, a coordinate system that uses a feature point within the image information as a reference point and maps the received position coordinates on the coordinate system.

13. The object tracking system of claim 9, wherein the object tracker tracks integrated position information about the object by calculating at least one of a moving direction and a moving speed of the object.

14. The object tracking system of claim 9, wherein the position information receiver receives, as the position coordinates, coordinates of the object that is calculated in association with a position tracking apparatus provided to the object.

15. The object tracking system of claim 9, further comprising:
    a control processing unit to display the received position coordinates on the image information in association with the object.

16. The object tracking system of claim 9, further comprising:
    a control processing unit to display the tracked integrated position information on the image information in association with the object using at least one of a symbol and a picture.

* * * * *